C. T. PALLY.
SAFETY HAT PIN.
APPLICATION FILED JAN. 16, 1911.

1,004,898.

Patented Oct. 3, 1911.

Witnesses
Kathryn Strehli
J. C. Smith Jr.

Inventor
Charles T. Pally
by John W. Strehli
Attorney

COLUMBIA PLANOGRAPH CO., WASHINGTON, D. C.

UNITED STATES PATENT OFFICE.

CHARLES T. PALLY, OF CINCINNATI, OHIO.

SAFETY HAT-PIN.

1,004,898.  Specification of Letters Patent.  Patented Oct. 3, 1911.

Application filed January 16, 1911. Serial No. 602,812.

*To all whom it may concern:*

Be it known that I, CHARLES T. PALLY, a subject of the Emperor of Germany, (who has made oath of his intention to become a citizen of the United States,) residing at the city of Cincinnati, in the county of Hamilton and State of Ohio, have invented certain new and useful Improvements in Safety Hat-Pins, of which the following is a specification.

This invention relates to improvements in safety hat pins, more particularly to protecting the end of the pin which passes through the hat, by placing a guard thereon, thus shielding the point.

It consists in providing a tube into which the point of the pin is inserted, the tube having inclined or gradually tapered and slightly flattened walls and being slightly compressed at its end.

It consists further in providing a pin with a flat surface back of the point. The inclined or gradually tapered and flattened part of the tube is longer in extent than the pin point.

By this construction, the pin can be inserted into the tube, and, by turning the pin, it will by impingement with the tube, be retained, or locked in place. This impingement is not on the conical end of the pin, but on the normal diameter or thickness of the pin body; thus it is not pushed or wedged into locked position, but purely by impingement or frictional contact with the normal thickness of the pin on the tube, the pin point not being frictionally in contact; the compressed end of the tube merely being present to keep the pin from going too far forward. When the pin is inserted and turned the tube is slightly sprung, yielding to the pressure exerted. By preventing the pin point from being wedged into a tapered tube, I preserve the point of the pin and prevent it from becoming smooth and uniformly worn, which I find from experimenting soon prevents the tube from grasping the point and it readily loosens its hold and becomes impracticable for use. By my construction, the pin is always grasped and locked into place and remains in this practical form and condition.

Figure 1:
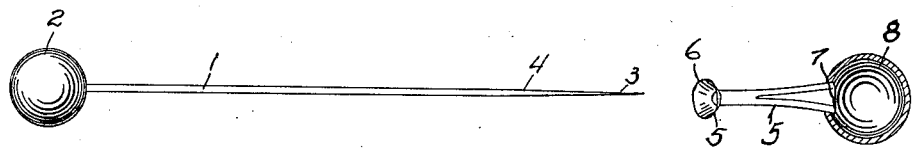
Figure 2:
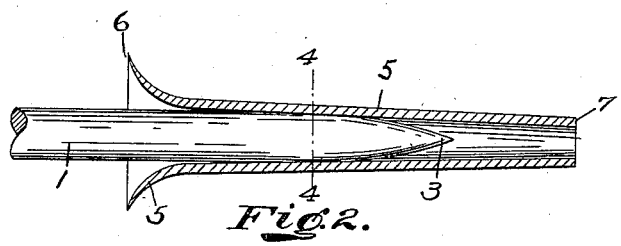
Figure 3:
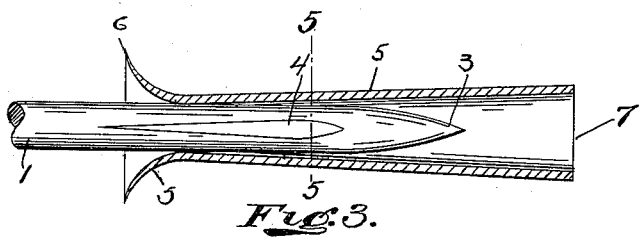
Figure 4:
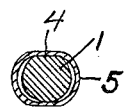
Figure 5:
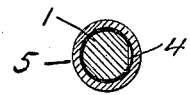

In the accompanying drawing forming part of this specification—Figure 1 is a view of the pin and tube, the tube being detached from the pin point; Fig. 2 is a longitudinal section of the tube, the pin being shown in elevation inserted therein; Fig. 3 is a longitudinal section of the tube, a plan view of the pin being shown inserted in the tube; Fig. 4 is a cross section taken on lines 4, 4 of Fig. 2 and Fig. 5 is a cross section taken on lines 5, 5, of Fig. 3, the pin being locked in place.

In the drawings, the pin 1 has a head 2 and a point 3. Directly back of the conical point 3, I provide a flattened surface 4. The tube, marked 5, is preferably provided with a flaring mouth 6 and a slightly compressed end 7, the tube being somewhat flattened as shown. I also preferably attach to the tube 5 an ornamental head 8. When it is desired to attach the tube, the pin is inserted until part of the normal thickness of the pin has passed into the tube, (see Fig. 4). The pin is then turned and by impingement against the inside of the tube, which is slightly flattened as shown is locked, (see Fig. 5), the tube yielding slightly and thus forming a perfect locking point; in Fig. 5 the tube as expanded is shown in an exaggerated form. It will be readily seen that by constructing the tube in this form, I protect the pin point and prevent it from wedging in the tube. When it is desired to remove the pin, it may be turned in either direction, when it will loosen in the tube and can readily be recovered.

The pin need not have the flattened surface but may be of any ordinary form. Of course I may use any number of flat places on the pin. The greater the flat surface, the tighter the pin will be locked and the greater the expansion of the tube. The gradual taper of the tube, renders it receptive for retaining various sized hat pins. All the tubes are open at the small tapered end, preventing injury to the pin point. The device is simple and exceedingly cheap. Of course any ornament or conventional figure may be placed on the end of the tube, similar to head on hat pin or otherwise. The flat part 4 of the pin extends slightly over onto the conical point of the pin so as to prevent a burr or high point being formed, which would pull the hair.

What I claim as new and my invention and desire to secure by Letters Patent is:

In a safety hat pin, the combination of a tube having a tapered yieldable flattened body and a hat pin having a flattened surface near its point to fit within the flattened body as set forth.

CHARLES T. PALLY.

Witnesses:
H. E. CARSTENS,
GEO. H. RICKS.

Copies of this patent may be obtained for five cents each, by addressing the "Commissioner of Patents, Washington, D. C."